(12) United States Patent
Cordaro et al.

(10) Patent No.: US 7,828,990 B1
(45) Date of Patent: Nov. 9, 2010

(54) LOW-MELTING POINT HEAT TRANSFER FLUID

(75) Inventors: Joseph Gabriel Cordaro, Oakland, CA (US); Robert W. Bradshaw, Livermore, CA (US)

(73) Assignee: Sandia Corporation, Livermore, CA (US)

( * ) Notice: Subject to any disclaimer, the term of this patent is extended or adjusted under 35 U.S.C. 154(b) by 0 days.

(21) Appl. No.: 12/336,657

(22) Filed: Dec. 17, 2008

Related U.S. Application Data (63) Continuation-in-part of application No. 12/120,257, filed on May 14, 2008, now Pat. No. 7,588,694.

(60) Provisional application No. 61/028,567, filed on Feb. 14, 2008.

(51) Int. Cl.
*C09K 5/00* (2006.01)
*C09K 5/04* (2006.01)

(52) U.S. Cl. .............. 252/71; 252/74; 252/67; 252/69; 423/179; 423/179.5

(58) Field of Classification Search .............. 252/71, 252/74, 67, 69; 423/179, 179.5
See application file for complete search history.

(56) References Cited

U.S. PATENT DOCUMENTS

| | | | | |
|---|---|---|---|---|
| RE23,017 E | * | 7/1948 | Bates | 252/71 |
| 2,692,234 A | * | 10/1954 | Insinger, Jr. | 252/71 |
| 4,340,578 A | * | 7/1982 | Erickson | 423/579 |
| 4,454,724 A | * | 6/1984 | Erickson | 62/112 |
| 4,559,993 A | * | 12/1985 | Picard et al. | 252/71 |
| 4,563,295 A | * | 1/1986 | Erickson | 252/69 |
| 5,244,592 A | * | 9/1993 | Michel | 252/71 |
| 7,588,694 B1 | * | 9/2009 | Bradshaw et al. | 252/71 |
| 2005/0247906 A1 | * | 11/2005 | Neuschutz et al. | 252/70 |

FOREIGN PATENT DOCUMENTS

| | | | |
|---|---|---|---|
| WO | WO 2008/071205 A1 | * | 6/2008 |
| WO | WO2008071205 A1 | | 6/2008 |

OTHER PUBLICATIONS

Emmanuel I. Eweka; David H. Kerridge; "Non-ideal change of electrical conductivity on solidification and remelting of salt eutectics 1. Oxyanion-based systems", Solid State Ionics 177, 2006, pp. 1245-1250.

P. I. Protsenko; R. P. Shisholina; "The K, Li II NO2, NO3 System", Russian Journal of Inorganic Chemistry, 1963, vol. 8, No. 12, pp. 1438-1441.

* cited by examiner

*Primary Examiner*—Mark Eashoo
*Assistant Examiner*—Jane L Stanley
(74) *Attorney, Agent, or Firm*—Timothy P. Evans (57) ABSTRACT

A low-melting point, heat transfer fluid made of a mixture of five inorganic salts including about 29.1-33.5 mol % $LiNO_3$, 0-3.9 mol % $NaNO_3$, 2.4-8.2 mol % $KNO_3$, 18.6-19.9 mol % $NaNO_2$, and 40-45.6 mol % $KNO_2$. These compositions can have liquidus temperatures below 80° C. for some compositions.

6 Claims, 6 Drawing Sheets

Figure 3: Viscosity of Molten Salt 013-1: 20 % Li 40 % Na 40% K 1:1 $NO_3/NO_2$ Figure 4: Viscosity of Molten Salt 013-2: 15 % Li 42.5 % Na 42.5 % K 1:1 $NO_3/NO_2$ Figure 5: Viscosity of Molten Salt 015-1: 29.1 % Li, 22.6 % Na, 48.3 % K 1:1 $NO_3/NO_2$

LOW-MELTING POINT HEAT TRANSFER FLUID

CROSS-REFERENCE TO RELATED APPLICATIONS

This application is a continuation-in-part application of and claims the benefit of, prior U.S. patent application Ser. No. 12/120,257 filed May 14, 2008 now U.S. Pat. No. 7,588,694, which itself claims priority to U.S. Provisional Application Ser. No. 61/028,567 filed Feb. 14, 2008 both of which are herein incorporated by reference.

FEDERALLY SPONSORED RESEARCH

This invention was made with Government support under government contract no. DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

BACKGROUND

The present invention relates generally to low-melting point inorganic nitrate salt compositions for use as heat transfer fluids and thermal energy storage media in solar energy application, such as solar parabolic trough electrical power plant systems.

When combined with thermal energy storage (TES), a solar parabolic trough electrical power plant has the important ability to dispatch electrical output to match peak demand periods. An important component of TES system optimization is the choice of heat transfer fluids used in the TES system and/or the solar field. Very large quantities (millions of kilograms) of heat transfer fluid are required for energy storage in 100-MW to 200-MW power plants and entail high capital investment costs, so minimizing that cost while maximizing the heat transfer fluid performance is paramount.

The current generation of commercial parabolic trough plants uses a mixture of organic compounds, diphenyl oxide and biphenyl, as the heat transport fluid in the collector field. This synthetic oil currently offers the best combination of low freezing point (12° C.) and upper temperature limit (393° C.) among available heat transfer fluids. However, the characteristics of this fluid have essentially set a floor on the levelized energy costs for two reasons. First, the peak allowable fluid temperature effectively limits live and reheat steam temperatures to about 370° C., which limits the gross efficiency of the Rankine cycle. The efficiency limit sets a minimum value for the required collector area per MWe of plant rating. Second, commercial solar projects can often reduce the levelized cost of energy through the addition of a thermal storage system. The storage system, in conjunction with a larger collector field, increases the annual capacity factor and distributes the operation and maintenance costs over a larger number of megawatt-hours. However, a direct thermal storage system using organic oil as the storage medium is generally considered to be too expensive.

Current commercial projects must rely on an indirect storage system, in which thermal energy from the field is transferred to a second fluid for storage. An indirect system entails performance penalties due to the temperature drops associated with the transfer of energy between the collector loop and storage as well as the cost of collection-to-storage heat exchangers. To relax the temperature and pressure limitations of a synthetic oil, a molten salt can be adopted as the heat storage fluid. These inorganic fluids offer several favorable characteristics, including upper temperature limits in the range of 500° C., lower unit cost, vapor pressures of only a few Pascals and satisfactory physical properties. The fluid properties allow two important advancements in the technology. The Rankine cycle efficiency improves, which reduces the collector area required per MWe of plant rating and the combination of low fluid cost and low vapor pressure allows the heat transport fluid to be used directly as the thermal storage medium. The elimination of the oil-to-nitrate salt heat exchangers also reduces the unit storage system costs. Such a direct system would benefit greatly from a redesigned parabolic trough system, such as the Supertrough described by Kolb and Diver.

Sandia National Laboratories has evaluated alternative inorganic molten salts that are inexpensive relative to organic fluids, can be used at higher temperatures of 450° C. to 500° C. or more (increasing power cycle efficiency), and have virtually no vapor pressure within operating temperatures and are thus amenable to use in large TES tanks. The primary disadvantage of most molten salt formulations is relatively high freeze points that range from about 130° C. to 230° C. depending on composition as compared to about 13° C. for organic fluids. As such, considerable care must be taken to ensure salt heat transfer fluid does not freeze in the solar field or other system or TES piping. Despite these engineering issues, overall evaluations for this direct molten salt heat transfer fluid approach have been encouraging, with the main issue being selection of a molten salt formulation with an acceptable freeze point as well as high temperature durability.

Several molten salt heat transfer fluids have been used for solar thermal systems. The binary Solar Salt mixture was used at the 10 MWe Solar Two central receiver project in Barstow, Calif. It will also be used in the indirect TES system for the Andasol plant in Spain. Among the candidate mixtures, it has the highest thermal stability and the lowest cost, but also the highest melting point. HITEC HTS® has been used for decades in the heat treating industry. This salt is thermally stable at temperatures up to 454° C., and may be used up to 538° C. for short periods, but a nitrogen cover gas is required to prevent the slow conversion of the nitrite component to nitrate. The currently available molten salt formulations do not provide an optimum combination of properties, freezing point, and cost that is needed for a replacement heat transfer fluid in parabolic trough solar fields. Therefore, the work summarized in this report sought to develop a heat transfer fluid that will better meet the needs of parabolic trough plants.

Table 1 compares the liquidus temperatures (liquid-solid phase transition temperature) of a number of molten nitrate salt mixtures. Inspection of published phase diagrams revealed that ternary mixtures of $NaNO_3$ and $KNO_3$ with several alkali and alkaline earth nitrates have quite low melting points. The eutectic of $LiNO_3$, $NaNO_3$ and $KNO_3$ melts at 120° C., while a mixture of $Ca(NO_3)_2$, $NaNO_3$ and $KNO_3$ melts at about 133° C. Several eutectic systems containing three constituents are liquids as low as 52° C. Unfortunately, melts containing ammonium nitrate decompose at a low temperature and those containing silver nitrate would be prohibitively expensive.

No phase diagrams appear to exist for mixtures of molten nitrate salts containing more than three constituents that would identify those having lower liquidus temperatures than the mixtures listed in Table 1. A straightforward approach to identifying an improved heat transfer fluid would be to add constituents to solar nitrate salt that depress the melting point significantly without compromising its properties. Metallic nitrates are obvious choices because of their miscibility and potential stability in contact with air. The thermodynamic criteria for melting point depression by additions of a second constituent have been summarized by Stolen and Grande. Constituents of systems whose phase diagrams that display eutectic behavior satisfy the thermodynamic criteria, while those that display peritectic behavior do not. Although the activity coefficients for all the mutual combinations of the alkali metal nitrates and alkaline earth nitrates are not available, we expect that such criteria will be satisfied by additions of calcium nitrate and lithium nitrate to sodium nitrate and potassium nitrate because all binary combinations of these nitrate salts display melting point depression, as well as eutectics, as do the ternary systems.

TABLE 1

Comparison of liquidus temperatures of various molten nitrate salt mixtures. Compositions are given as mol %, cation basis. Temperature data were obtained from Phase Diagrams for Ceramists published by American Ceramic Society/NIST.

| Na mol % | K mol % | Ca mol % | Li mol % | $NH_4$ mol % | Other mol % | Liquidus Temp. °C. | Notes |
|---|---|---|---|---|---|---|---|
| 50 | 50 | | | | | 221 | Na-K-$NO_3$ eutectic |
| 66 | 34 | | | | | 238 | Binary Solar Salt (60-40, by wt.) |
| 7 | 44 | | | | 49 $NaNO_2$ | 141 | |
| 21 | 49 | 30 | | | | 133 | Ca-Na-K-$NO_3$ eutectic |
| 18 | 52 | | 30 | | | 120 | Li-Na-K-$NO_3$ eutectic |
| | 58 | 11 | 31 | | | 117 | Ca-Li-K-$NO_3$ eutectic |
| | 19.3 | 29.4 | 51.3 | | | 92 | Poor thermal stability due to $NH_4NO_3$ |
| | 20.7 | | 60.2 | 19.1 | | 52 | Lowest melting mixture identified in literature $AgNO_3$ |

In this work, we investigated common-anion additions to $NaNO_3$—$KNO_3$ mixtures (binary Solar Salt) as a means to identify low melting (low liquidus temperature) mixtures. We evaluated the properties of multi-component molten nitrate salt mixtures as alternative heat transfer and storage fluids for a parabolic trough system. We were particularly interested in the chemical stability and viscosity of multicomponent mixtures that display significantly lower melting points than Solar nitrate salt. The necessary chemical stability data regarding multi-component mixtures of alkali and/or alkaline earth nitrates were obtained experimentally.

Of course, improved molten salt compositions will be useful for a wide range of industrial process heat applications, in addition to solar thermal heat transfer and thermal energy storage systems.

SUMMARY

A low-melting point, heat transfer fluid made of a mixture of four inorganic nitrate salts including 9-18 wt % $NaNO_3$, 40-52 wt % $KNO_3$, 13-21 wt % $LiNO_3$, and 20-27 wt % $Ca(NO_3)_2$. These compositions can have liquidus temperatures less than 100° C.; thermal stability limits greater than 500° C.; and viscosity in the range of 5-6 cP at 300° C.; and 2-3 cP at 400° C.

Also disclosed is an improved low melting point heat transfer fluid having a multicomponent, alkali-nitrate/alkali-nitrite salt system. The improved salt system having 29.1-33.5 mol % $LiNO_3$, 0-3.9 mol % $NaNO_3$, 2.4-8.2 mol % $KNO_3$, 18.6-19.9 mol % $NaNO_2$, and 40-45.6 mol % $KNO_2$; the salt system having a liquidus temperature well below 80° C.

BRIEF DESCRIPTION OF THE DRAWINGS

The accompanying drawings, which are incorporated in and form part of the specification, illustrate various examples of the present invention and, together with the detailed description, serve to explain the principles of the invention.

DETAILED DESCRIPTION OF THE INVENTION

A heat transfer fluid (HTF) for use at elevated temperatures was formulated by combining sodium nitrate, potassium nitrate, lithium nitrate and calcium nitrate. The key properties that are provided by the particular range of compositions determined experimentally are low solidification point, stability at high temperature, stability in contact with air, low viscosity, low cost, non-corrosive to typical container materials, low vapor pressure and high heat capacity. The heat transfer liquid may be used for heat collection and transfer; and thermal energy storage in solar energy systems, among other applications. A new formulation of molten nitrate salts will first and foremost provide a heat transfer fluid that has a lower freezing point than is currently available from any molten salt mixture of inorganic nitrate and/or nitrite salts available commercially. A solid phase will not form in these mixtures until the temperature is below 100° C. This allows the HTF to be used in applications in which the expensive parasitic energy costs necessary for freeze protection can be significantly reduced. As a specific example, this new HTF will enhance the value of energy delivered from parabolic trough solar energy plants because the cost of operating and maintaining the solar system will be significantly lower with a molten salt formulation that freezes at the lower temperatures. The new formulations are sufficiently stable at high temperature that it will increase the upper temperature limits of the HTF in the solar field operating environment compared to the synthetic oils currently used as HTF. The higher operating temperature limit significantly increases power cycle efficiency and overall power plant sun-to-net electric efficiency.

Existing technology for inorganic molten salt HTF is based on either 2-component mixtures of sodium nitrate and potassium nitrate or 3-component mixtures of the preceding salts with calcium nitrate. The new formulation is technically different in that it consists of a four-component mixture using lithium nitrate in combination with the above. However, the simple combination of arbitrary proportions of these four nitrate salts will not result in a mixture that begins to solidify at a temperature of interest for HTF applications and solar thermal energy systems in particular.

The range of compositions that combine four inorganic nitrate salts, and are suitable for the purpose of solar energy applications, include:

Range of Compositions (wt %)

9-18 wt % $NaNO_3$,
40-52 wt % $KNO_3$,
13-21 wt % $LiNO_3$, and
20-27 wt % $Ca(NO_3)_2$ Note that these compositions can be either specified in Mole % (Mol %), or in Weight % (wt %).

Specific compositions were made and tested:

Composition "QA" (Mol %, Cation Basis)

16 mol % $NaNO_3$,
47 mol % $KNO_3$,
25 mol % $LiNO_3$, and
12 mol % $Ca(NO_3)_2$.

Composition "QA" is mostly liquid at 96.7° C.

Composition "QB" (Mol %, Cation Basis)

20 mol % $NaNO_3$,
38 mol % $KNO_3$,
31 mol % $LiNO_3$, and
12 mol % $Ca(NO_3)_2$ Composition "QB" has a liquid phase at 96.7° C., but less liquid than Composition #1 at that temperature.

Composition "QC" (Mol %, Cation Basis)

11 mol % $NaNO_3$,
50 mol % $KNO_3$,
27 mol % $LiNO_3$, and
12 mol % $Ca(NO_3)_2$ Composition "#1" (Mol %, Cation Basis)

14 mol % $NaNO_3$,
49 mol % $KNO_3$,
20 mol % $LiNO_3$, and
17 mol % $Ca(NO_3)_2$ These new molten salt compositions (formulations) have improved properties compared to the oil-based HTF currently used in solar power plants. First, the molten salt costs significantly less. Second, the molten salt is relatively benign in terms of environmental impact, whereas the oil is toxic and carries cleanup and waste disposal penalties when leaks occur. Third, the molten salt has a higher density and heat capacity, requiring lower flows, much lower pressure drops in the system piping (which reduces pumping costs) and enhanced heat transfer capability. Fourth, the molten salt HTF allows a higher operating temperature differential in the solar field and greater temperature gradients in thermal storage systems which greatly enhances efficiency and thermal storage utilization. Fifth, the molten salt can be operated at higher temperatures which, as noted above, leads to higher power cycle and power plant efficiencies. Six, molten salt has virtually no inherent vapor pressure, which allows its use in thermal energy storage tanks that are vented to atmosphere versus using high-cost pressure vessels that would be required for other HTF types. Seven, the molten salt HTF is stable in contact with air and is not flammable.

The new formulation is a physical mixture of constituents that are completely miscible in the molten state in all proportions. The range of proportions of the constituents that will optimize the desired properties of an HTF (freezing point, upper stability temperature, cost, low viscosity) is relatively narrow, and is not obvious based upon existing information regarding the phase diagrams of many ternary systems of alkali and alkaline earth nitrates have been published. No phase diagrams for quaternary (four-component) molten salt mixtures of such constituents were discovered during a search of the literature via on-line resources or hard copies of phase diagram handbooks. Although additions of soluble constituents to molten salts having a common anion typically depress the freezing point of such mixtures, this is not necessarily the case for multi-component mixtures. Furthermore, the thermodynamic database that would allow predictions of phase behavior based on the composition of multi-component mixtures is virtually non-existent and thus not suitable for accurate calculations of phase stability. For this reason, the composition required to achieve the lowest-melting mixture is not obvious, and must be determined by experiments using a range of molten salt compositions.

Experimental Results

The quaternary molten salt mixtures were prepared from $NaNO_3$, $KNO_3$, $LiNO_3$ and $Ca(NO_3)_2$-tetrahydrate Reagent Grade salts (Sigma-Aldrich Co., St. Louis, Mo.). To melt small quantities of the nitrate mixtures for observations of solidification behavior and viscosity measurements, weighed amounts of the individual salts were loaded into high-purity alumina crucibles and were heated in small furnaces open to the atmosphere. The temperature was initially maintained at approximately 150° C. to allow the water of hydration of the calcium nitrate constituent to evolve slowly. After visual indications of vapor evolution ceased, the melts were heated to 350° C. to 400° C., periodically stirred, and maintained at an elevated temperature for at least one overnight period before cooling and sub-dividing for property determinations.

Chemical stability tests were performed by melting several kilograms of molten salt mixtures in stainless steel crucibles that were equipped with gas dispersion tubes. The melts were heated to successively higher temperatures, up to at least 520° C., and kept at each constant temperature for several days as dry air was bubbled through the melt. Salt samples were removed at each temperature increment for chemical analysis. The nitrite ($NO_2^-$) concentration was assayed by Hach Analytical Method 8153 using a Hach Co. (Loveland, Colo.) DR2010 UV-VIS spectrometer.

The liquidus temperature, at which solidification begins, was determined for a range of multi-component molten nitrate salt compositions. Approximately 10 grams of the salt mixtures were placed in Pyrex test tubes which were housed in several recesses in a large aluminum block to dampen temperature fluctuations. The assembly was heated in an oven and temperatures were progressively lowered from about 20° C. above the liquidus point until a small amount of a solid phase was observed in a particular tube. The corresponding liquid phase was sampled and analyzed to determine the cation ratios of the residual liquid. Each temperature stage was maintained for at least several days and typically for a week or longer at temperatures below 100° C. In some tests, an alumina chip was added to assure nucleation sites were present for solidification.

The viscosities of numerous molten salt mixtures were measured using a Brookfield DV-II+viscometer (Brookfield Engineering, Middleboro, Mass.). The molten salt mixtures were contained in a stainless steel tube that was heated in a small furnace at constant temperature maintained by a Brookfield Thermosel controller. Viscosities were measured by increasing the temperature sequentially from a starting temperature about 10° C. to 20° C. above the liquidus to a maximum of approximately 220° C., then successively decreasing the temperature to re-determine values for repeatability. The molten salt was maintained at each temperature sufficiently long for a steady state to be attained and the viscosity to indicate a constant value. The viscometer configuration was limited to about 10 cP at the low end of measured values. However, despite the limited accuracy of low viscosity measurements, it was adequate to compare the effect of the constituents of the molten salt mixtures on viscosity.

An important property of the quaternary molten salt formulations is the liquidus temperature, at which a solid phase is formed by a particular composition. For binary mixtures of alkali metal nitrates and alkaline metal nitrates, the minimum liquidus temperature is typically a eutectic point. Ternary phase diagrams of molten nitrates are typically more complex than simple eutectic systems. The phase behavior of multi-component mixtures of nitrate salts is likely to be even more complex, as well as difficult to represent graphically.

Three different mixtures of the four nitrate salts were identified that display liquidus temperatures less than 100° C. These quaternary mixtures are designated QA, QS and QC, and are composed of the proportions of constituents as given in Table 2. All of the four constituent nitrate salts must be present in significant proportions to create a low-melting mixture, based on those evaluated to date. Liquidus temperatures for several such mixtures are collected in Table 2 and are compared with published values for several binary and ternary nitrate mixtures.

Computational molecular dynamics methods are in progress to identify minimum liquidus compositions and provide directions within the four-dimensional composition space that indicates lower liquidus temperatures.

TABLE 2

Liquidus temperatures of multi-component molten nitrate salt mixtures. Compositions are given as mol %, cation basis.

| Na mol % | K mol % | Ca mol % | Li mol % | Liquidus Temp. ° C. | Notes |
| --- | --- | --- | --- | --- | --- |
| 50 | 50 | | | 221 | Na—K—NO$_3$ eutectic |
| 21 | 49 | 30 | | 133 | Ca—Na—K—NO$_3$ eutectic |
| 18 | 52 | | 30 | 120 | Li—Na—K—NO$_3$ eutectic |
| | 58 | 11 | 31 | 117 | Ca—Li—K—NO$_3$ eutectic |
| 20 | 38 | 12 | 31 | <95 | QA |
| 16 | 47 | 12 | 25 | <95 | QB |
| 11 | 50 | 12 | 27 | <95 | QC |

Chemical Stability of Molten Salts

It is essential that low-melting molten salt mixtures be sufficiently stable at high temperature to realize any advantages in a solar thermal energy system. The primary aspects of molten nitrate salt chemistry that are relevant to solar thermal applications are the primary equilibrium chemistry and the reactions by which the molten salts interact with atmospheric gases such as carbon dioxide. The chemical equilibrium of the binary Solar salt mixture has been studied at high temperature and the mixture is quite stable up to 600° C. The primary reaction is the partial dissociation of nitrate ion ($NO_3^-$) to nitrite ion ($NO_2^-$) and oxygen, as shown by Equation 1. The shift from nitrate to nitrite occurs slowly and is limited by the partial pressure of oxygen in the atmosphere contacting the molten salt. The equilibrium constant for the nitrate dissociation reaction, $K_1$, is given by Equation 2, in which the molar concentrations of the anions and the partial pressure of oxygen represent the thermodynamic activities of the compounds.

$$NO_3^- \rightleftharpoons NO_2^- + \tfrac{1}{2}O_2 \tag{1}$$

$$K_1 = \frac{[NO_2^-](P_{O_2})^{1/2}}{[NO_3^-]} \tag{2}$$

Nissen and Meeker measured the equilibrium constant for an equimolar mixture of $NaNO_3$ and $KNO_3$. The equilibrium shift of the equimolar mixture results in 1.1 mol % (anion basis) nitrite at 500° C. and 5.7 mol % at 600° C. in contact with air. The nitrite shift behavior of ternary molten nitrate salts containing either calcium nitrate or lithium nitrate additions to binary mixtures of $NaNO_3$ and $KNO_3$ has been shown to follow Equations 1 and 2. The values of the equilibrium constant depend somewhat upon the particular composition of the mixture but are comparable to that of binary Solar Salt.

Figure 1:
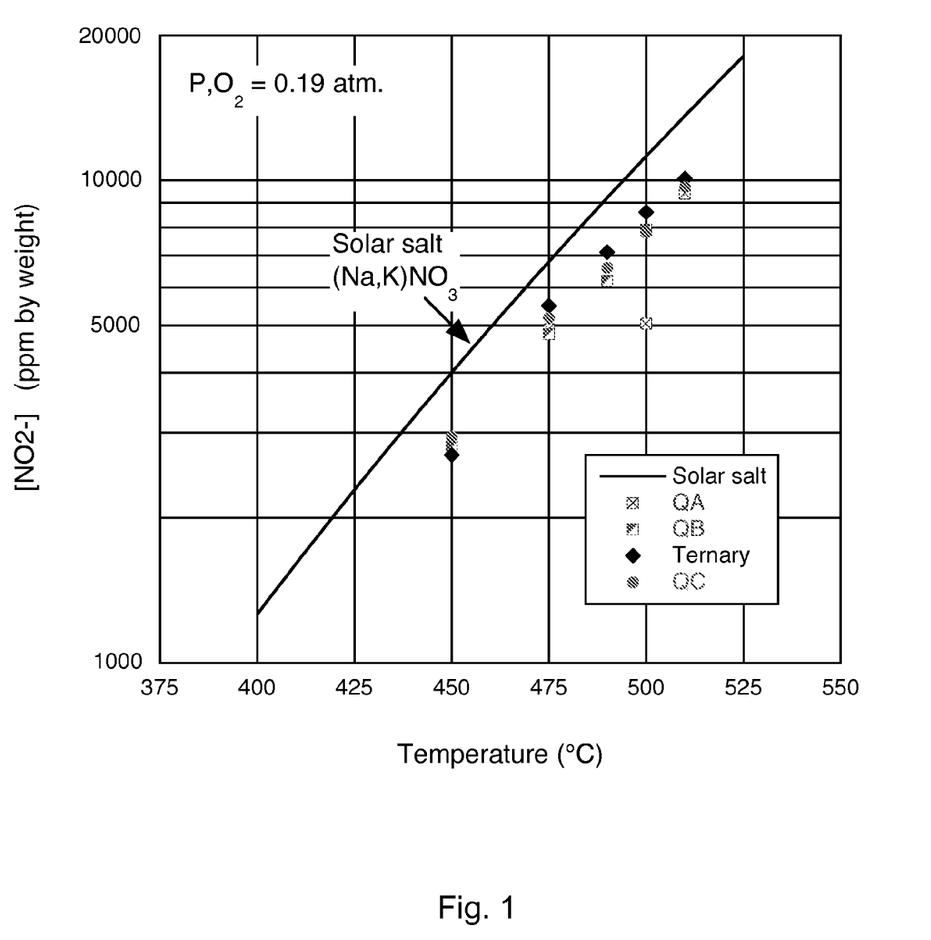
FIG. 1 shows the nitrite concentrations in quaternary molten nitrate salts at chemical equilibrium with air, compared to binary Solar Salt.

The equilibrium concentrations of nitrite ion in several quaternary nitrate salt mixtures were measured between temperatures of 450° C. and 510° C. The results are plotted in FIG. 1, which shows ppm by weight of nitrite ion versus temperature in a semi-log format. The four-component molten salts, having the compositions designated QA, QB and QC, as given in Table 2. The line indicates the behavior of binary Solar Salt. The concentration of nitrite in the quaternary mixtures is somewhat less, but basically comparable, to that calculated for the binary Solar Salt at corresponding temperatures. The Na—K—Li nitrate eutectic mixture (shown as filled diamond symbols) was also studied and the results confirmed measurements made in an earlier study. The chemical equilibrium data follow the same trend with temperature as Solar Salt, which indicates that the enthalpy of the controlling chemical process is effectively the same, i.e., reaction (1).

Because the equilibrium concentration of nitrite is less than one percent at the proposed maximum operating temperatures of solar trough systems, molten salts, which contain substantial concentrations of nitrite, such as HITEC® HTS, must be protected from contact with air. Such contact gradually reverses reaction (1), thereby decreasing the nitrite level and consequently increasing the melting point. Low-melting molten salts containing significant amounts of nitrite that may be identified by future experimental studies would require a system designed to minimize or avoid contact with air. Such systems are within the design envelope of a trough receiver system.

Nitrite ions, as well as nitrate ions, may decompose at sufficiently high temperature to yield several types of oxide ion species, e.g., oxide, peroxide and superoxide. A generalized decomposition reaction of nitrite is given by Equation 3, in which oxide ion formation is accompanied by evolution of nitrogen oxides. Carbon dioxide in the atmosphere has a marked effect on the concentrations of oxide ion species in nitrate melts. Carbon dioxide in air will convert oxide ions to carbonate, according to Equation 4.

$$2NO_2^- \rightarrow O^{-2} + NO_x \text{ (several species)} \quad (3)$$

$$CO_2 + O^{-2} \rightarrow CO_3^{-2} \quad (4)$$

The solubility of carbonate ion in binary Solar Salt is approximately 5 mol % near the eutectic point. Such a high solubility presents little concern for a heat transfer and storage system because an extremely long time would be required to absorb enough $CO_2$ from the atmosphere to saturate a large mass of molten salt. However, no phase diagrams are available for multi-component systems to indicate the solubility of carbonate. Solubility of carbonate appears to be significantly less in multi-component nitrate mixtures containing calcium nitrate. A solid phase was observed at high temperature in molten ternary mixtures of $NaNO_3$, $KNO_3$ and $Ca(NO_3)_2$ at temperatures from 500° C. to about 540° C., depending on the proportion of calcium nitrate present. These melts were contacted for several days with air by a bubbler to enhance the interaction of the molten salt with carbon dioxide. Chemical analysis of salt samples identified the presence of carbonate ions. The concentration of dissolved carbonate ions increased with temperature but saturation levels were not determined.

An important consequence of decomposition reactions with regard to using a molten nitrate salt mixture as a heat transfer fluid is that insoluble products may form, which tend to plug valves, pipes and heat transfer surfaces. Another effect is that the soluble oxide ions aggravate corrosion at high temperatures. The use of nitrate molten salts for heat transfer or storage at high temperature is limited by reactions (3) and (4). Observations regarding the appearance of a solid phase in multi-component molten salt mixtures are collected in Table 3. The quaternary mixtures gave visible indications of solid phases after several days at 520° C. accompanied by $CO_2$ bubbling. This material was a small fraction of the melt and was not amenable to sampling in the experimental apparatus used. In contrast, the ternary Li—Na—K-nitrate melt did not demonstrate any solid phases after similar periods at 540° C., which agrees with behavior reported in previous experiments. It appears that the quaternary nitrate mixtures are chemically stable at temperatures of nominally 500° C. The chemical stability is being further evaluated during prolonged testing.

TABLE 3

Approximate thermal stability limits of selected molten nitrate and nitrate-nitrite salt mixtures. Compositions are given as mol %, cation basis.

| Na mol % | K mol % | Ca mol % | Li mol % | Other | Maximum Temp. ° C. | Notes |
|---|---|---|---|---|---|---|
| 66 | 34 | | | | 600 | Binary Solar Salt (60-40 by weight) |
| 7 | 44 | | | 49 $NaNO_2$ | 450-538 | HITEC ® HTS ($N_2$ cover gas) |
| 18 | 45 | | 37 | | 550 | |
| 30 | 50 | 20 | | | 505 | |
| 20 | 50 | 30 | | | 480 | |
| 20 | 38 | 12 | 31 | | ~520 | QA |
| 16 | 47 | 12 | 25 | | ~520 | QB |
| 11 | 50 | 12 | 27 | | ~520 | QC |
| 18 | 45 | | 37 | | >540 | Li-Na-K-Nitrate eutectic |

The temperature values refer to melts in contact with air except for HITEC ®.

Viscosity of Molten Salts

Figure 2:
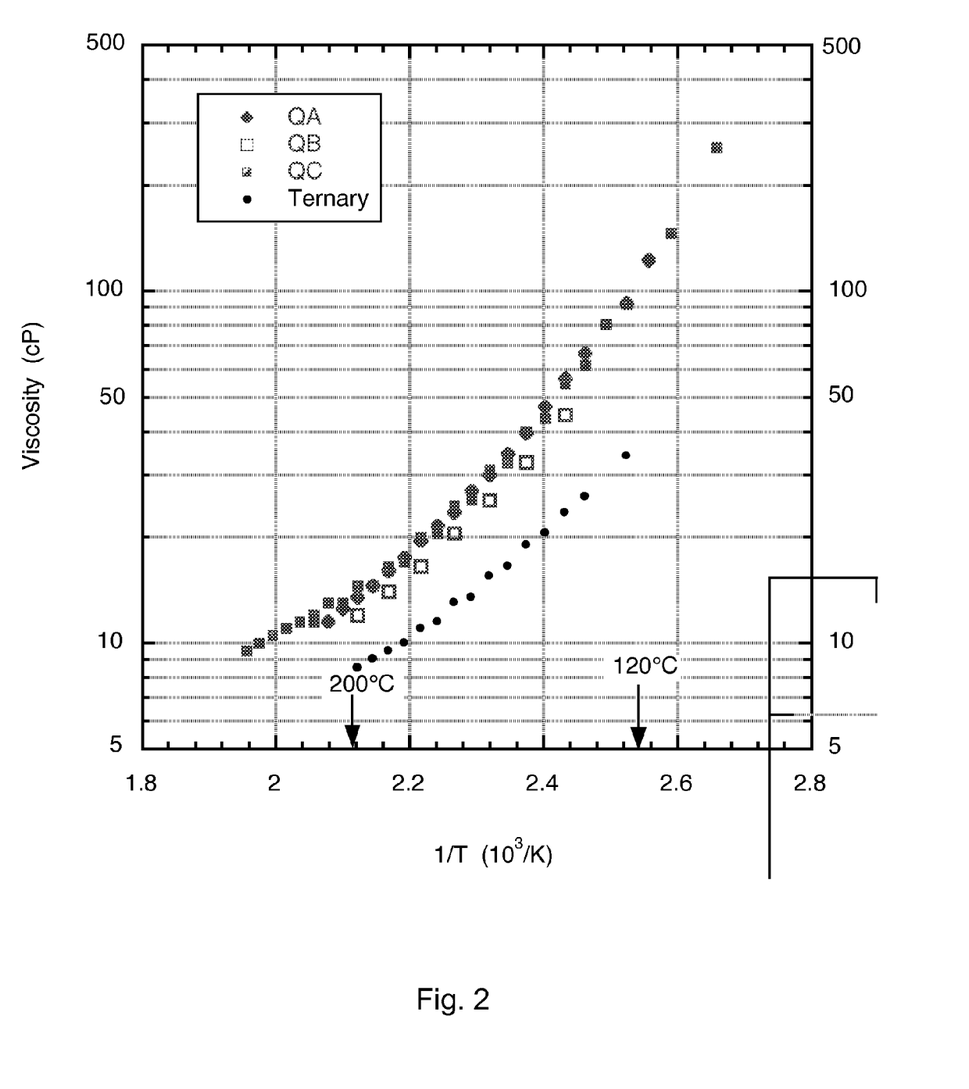
FIG. 2 shows the viscosity of quaternary molten nitrate salts, compared to the ternary lithium-sodium-potassium nitrate salt.

The physical properties of heat transfer fluids, viscosity, density, heat capacity and thermal conductivity, are needed to perform engineering design calculations of trough collector and storage systems. Viscosity is particularly important because it strongly influences pumping costs in a distributed system with extended piping runs, such as a trough receiver plant. The viscosity of a number of molten salt mixtures were measured to determine the effects of the various constituents. FIG. 2 presents an Arrhenius plot of viscosity measurements for the same quaternary molten salt mixtures that were discussed in the preceding section on chemical stability. This plot also contains data for the Li—Na—K-nitrate eutectic, which freezes at 120° C., for comparison.

Calcium nitrate additions to the multi-component molten salts significantly increase the viscosity. This result has been reported previously for binary mixtures of calcium nitrate and potassium nitrate. The viscosity near the liquidus temperature was approximately 200 cP, which is not an unreasonable value for handling in a TES system. The viscosity at temperatures in the median range of normal operation of a trough system, e.g., 300° C., is approximately 5-6 cP and is 2-3 cP at 400° C., as determined by extrapolating the data from the measurable temperature range. Melts that contain appreciable calcium nitrate also display curvature in an Arrhenius plot in contrast to the linear slope of the calcium-free ternary melt. Such behavior has been reported and discussed by Rhodes and co-workers.

The experimental results generally agree with published studies to the extent that the compositions of the molten salts can be compared within their respective liquid phase temperature ranges. Calcium nitrate-containing molten salts tend to form glassy, viscous melts near the freezing temperature while lithium nitrate appears to have a minor effect on the viscosity of mixtures. Further development studies will determine how to adjust the proportions of the constituents of a quaternary molten salt to minimize the low-temperature viscosity, while optimizing other fluid properties and cost.

We have identified, therefore, a class of quaternary molten salt compositions, based on solar nitrate salt, that display much lower liquidus temperatures and that may be useful as heat transfer fluids for solar thermal energy systems. These molten salt mixtures contain calcium nitrate and lithium nitrate to depress the melting point of a salt mixture based on sodium nitrate and potassium nitrate. We established the working temperature ranges of these mixtures experimentally and determined the viscosity at the low temperature range of these molten salts. At the limiting maximum temperature, instability was manifested by the appearance of solid phases. However, it appears to be feasible to use these quaternary mixtures at maximum temperatures of 500° C. Although viscosity is considerably higher than binary Solar Salt, it does not preclude using the molten salts at a low temperature. Cost estimates are qualitative at this point, although these molten salt mixtures are expected to be relatively inexpensive compared to organic heat transfer fluids, thus making them amenable for use in large-scale thermal energy storage systems. Experimental studies are currently in progress to fully evaluate and optimize the physical and chemical properties of these molten nitrate salts.

Table 4 below lists specific samples of quaternary nitrate salts (in mol %, cation basis), that were prepared in the laboratory.

TABLE 4

Compositions of sample quaternary nitrate salts (mol %, cation basis).

| Sample | $NaNO_3$ (Mol %) | $KNO_3$ (Mol %) | $LiNO_3$ (Mol %) | $Ca(NO_3)_2$ (Mol%) |
|---|---|---|---|---|
| 1 | 28 | 29 | 26 | 16 |
| 2 | 29 | 28 | 16 | 26 |
| 3 | 30 | 30 | 30 | 10 |

TABLE 4-continued

Compositions of sample quaternary nitrate salts (mol %, cation basis).

| Sample | NaNO$_3$ (Mol %) | KNO$_3$ (Mol %) | LiNO$_3$ (Mol %) | Ca(NO$_3$)$_2$ (Mol%) |
|---|---|---|---|---|
| 4 | 31 | 32 | 31 | 6 |
| 5 | 20 | 38 | 30 | 12 |
| 6 | 16 | 47 | 27 | 10 |
| 7 | 17 | 50 | 29 | 5 |
| 8 | 15 | 45 | 27 | 8 |
| 9 | 9 | 36 | 30 | 10 |
| 10 | 17 | 43 | 35 | 5 |
| 11 | 16 | 41 | 32 | 10 |
| 12 | 20 | 38 | 30 | 12 |
| 13 | 21 | 40 | 27 | 12 |
| 14 | 18 | 37 | 33 | 12 |
| 15 | 19 | 39 | 27 | 15 |
| 16 | 15 | 45 | 25 | 15 |
| 17 | 15 | 52 | 22 | 11 |
| 18 | 12 | 49 | 18 | 11 |

An Improved Salt System—Experimental Results

We have evaluated the properties of several other multi-component molten alkali-nitrate/alkali-nitrite salt mixtures as alternative heat transfer and storage fluids for a variety of applications. In this work, we investigated the salt mixture system comprising some or all of the five constituents NaNO$_3$, KNO$_3$, LiNO$_3$, NaNO$_2$ and KNO$_2$ as a means for identifying lower melting salt solutions (low liquidus temperature). We were particularly interested in the chemical stability and viscosity of multi-component mixtures that display significantly lower melting points than the nitrate salts. Specifically, a mixture consisting of a 1:1 molar ratio of nitrate-to-nitrite anion, with 40 mol % sodium, 40 mol % potassium, and 20 mol % lithium cation was found to have a liquidus temperature near 95° C. This mixture was made by combining NaNO$_3$, KNO$_3$, LiNO$_3$, NaNO$_2$, and KNO$_2$ in order to obtain the proper stoichiometry. A liquidus temperature near 105° C. was found for two mixtures containing 15 mol % lithium cation, 42.5 mol % sodium and 42.5 mol % potassium, and either a 1:1 or a 1:2 ratio of nitrate-to-nitrite. Finally, lowering the amount of lithium to 10 mol % and raising the sodium and potassium content to 45 mol % provided a liquidus temperature at 110° C.

Therefore, because samples containing equal molar amounts of Na and K exhibit a liquidus temperature a) below 110° C. with 10% Li cation; b) below 105° C. with 15% Li and c) below 95° C. with 20% Li it was thought that by adding additional Li cation one could further decrease the liquidus temperature of these salt mixtures.

Additional experimentation was conducted by varying the NO$_3$/NO$_2$ anion ratio between about 0.8 to about 0.56 and increasing the Li cation concentration from about 29 mol % to about 33.5 mol %. Compositions of the mixture identified with liquidus melting points well below 100° C. are listed below in Tables 5a and 5b. In particular, a liquidus temperature of 70° C. was found for a composition having 33.5% Li, 18.6% Na, 47.9% K cation mixture and a 0.56 molar ratio of NO$_3$/NO$_2$ anion. The specific composition used to formulate this lowest melting salt was 30 wt % LiNO$_3$, 3.2 wt % KNO$_3$, 16.7 wt % NaNO$_2$, and 50.2 wt % KNO$_2$.

However, those skilled in the art will appreciate that many solutions actually exist to the same algebraic problem posed by the composition constrains listed above. One can, for instance, prepare many different combinations of the five ingredients to obtain the final mole percentage of each of the cation or anion species since there are two sources for Na and K. Therefore, while the values shown in Table 5b are the actual values used for the various experiments we conducted, other weight percentage values could have been used to achieve the same final compositions shown in Table 5a.

We believe that the molten salt compositions shown above will significantly extend the lower temperature range of a heat transfer fluid suitable for use in a solar thermal collector field.

TABLE 5a

Liquidus temperatures of multi-component molten nitrate/nitrite mixtures.

| Li (mol %) | Na (mol %) | K (mol %) | NO$_3$ (mol %) | NO$_2$ (mol %) | NO$_3$/NO$_2$ ratio | Liquidus Temp. (° C.) |
|---|---|---|---|---|---|---|
| 10 | 45 | 45 | 50 | 50 | 1 | 110 |
| 15 | 42.4 | 42.6 | 50 | 50 | 1 | 105 |
| 15 | 42.4 | 42.6 | 33 | 67 | 0.50 | 105 |
| 20 | 40 | 40 | 50 | 50 | 1 | 95 |
| 29.2 | 23.1 | 47.7 | 45.4 | 54.6 | 0.83 | 85 |
| 30.4 | 19.8 | 49.8 | 44.1 | 55.9 | 0.79 | 85 |
| 29.1 | 22.6 | 48.3 | 41.2 | 58.8 | 0.70 | <80 |
| 29.8 | 19.9 | 50.3 | 37.5 | 62.5 | 0.60 | 75 |
| 33.5 | 18.6 | 47.9 | 35.9 | 64.1 | 0.56 | 70 |

(Compositions are given as mol % of cation or anion.)

TABLE 5b

Liquidus temperatures of multi-component molten nitrate/nitrite mixtures.

| LiNO$_3$ (wt %) | NaNO$_3$ (wt %) | KNO$_3$ (wt %) | NaNO$_2$ (wt %) | KNO$_2$ (wt %) | Liquidus Temp. (° C.) |
|---|---|---|---|---|---|
| 8.3 | 20.6 | 24.5 | 20.9 | 25.7 | 110 |
| 12.7 | 18.2 | 21.8 | 21.1 | 26.2 | 105 |
| 13.1 | 9.7 | 11.6 | 29.3 | 36.3 | 105 |
| 17.2 | 15.9 | 18.9 | 21.5 | 26.5 | 95 |
| 25.4 | 0 | 20.7 | 20.1 | 33.8 | 85 |
| 26.5 | 4.2 | 12.5 | 13.8 | 43 | 85 |
| 25.5 | 4.2 | 10.6 | 16.4 | 43.3 | <80 |
| 26.2 | 0 | 10 | 17.5 | 46.3 | 75 |
| 30 | 0 | 3.1 | 16.7 | 50.2 | 70 |

(Compositions are given as wt % of cation or anion.)

Figure 3:
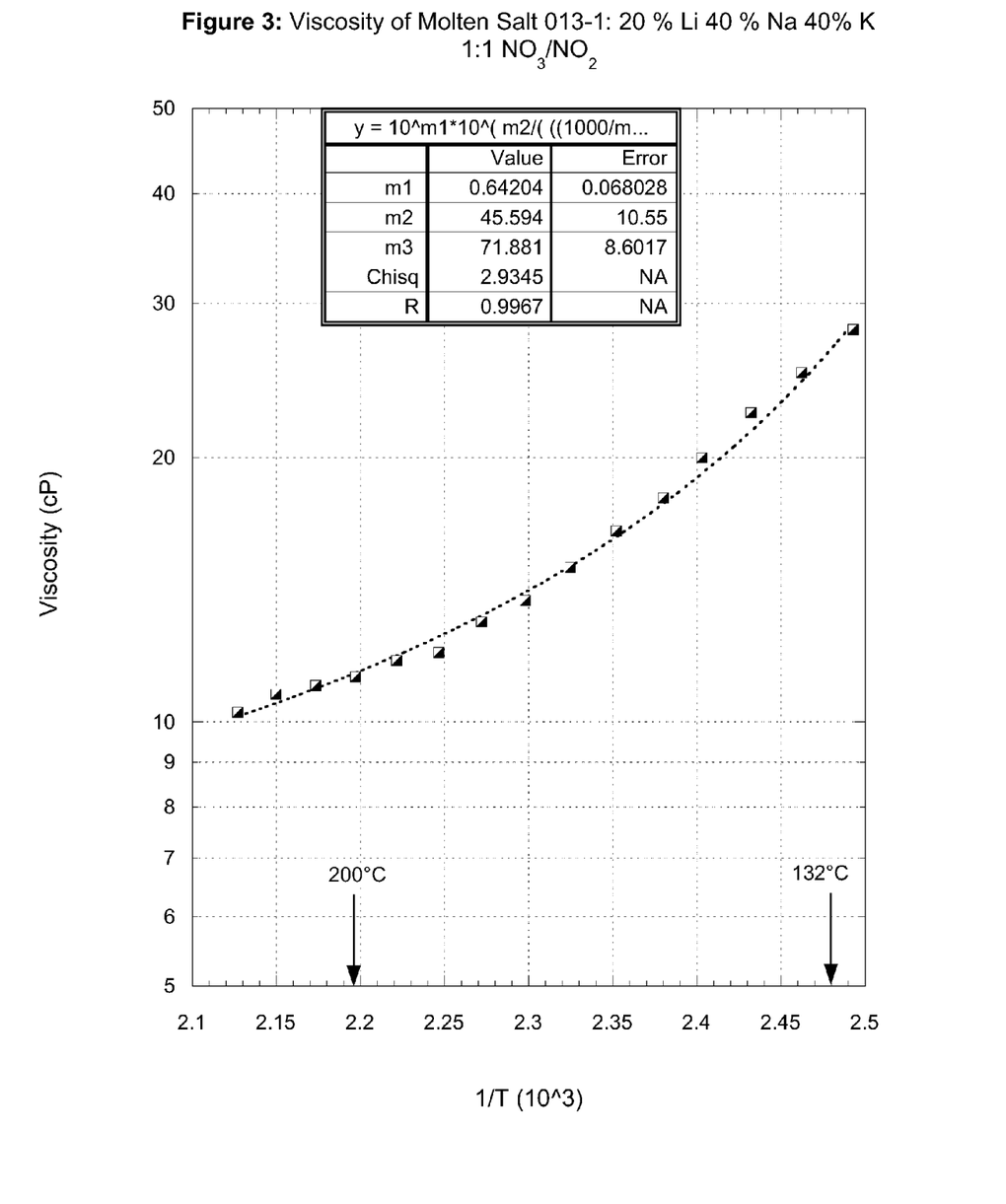
FIG. 3 shows the viscosity of a molten salt comprising 20% Li, 40% Na, and 40% K and having a 1:1 $NO_3/NO_2$ ratio.
Figure 4:
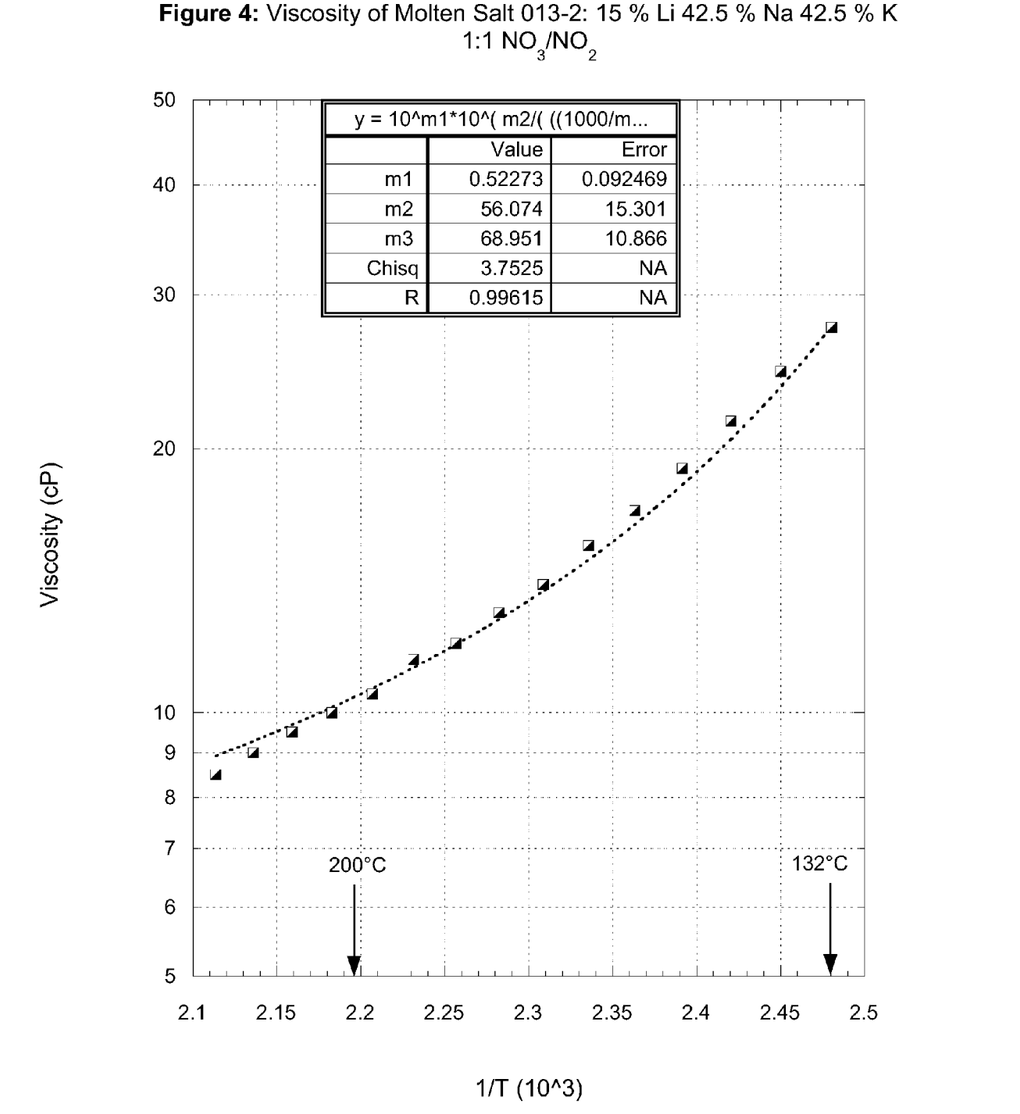
FIG. 4 shows the viscosity of a molten salt comprising 15% Li, 42.5% Na, and 42.5% K and having a 1:1 $NO_3/NO_2$ ratio.
Figure 5:
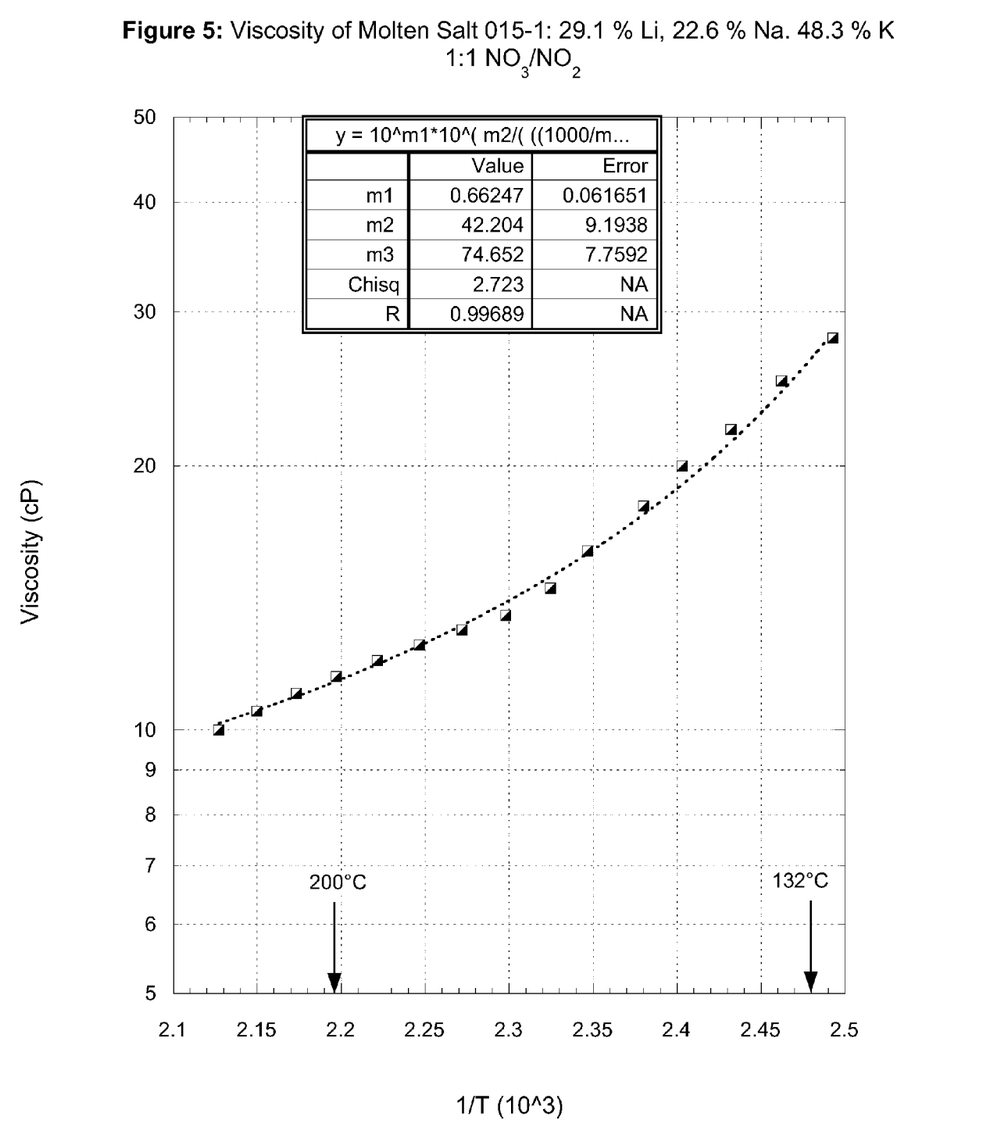
FIG. 5 shows the viscosity of a molten salt comprising 29.1% Li, 22.6% Na, and 48.3% K and having a 1:1 $NO_3/NO_2$ ratio.

The viscosities of several of the molten salt compositions (and analogs) described above were measured between 120-200° C. The results of these measurements are shown below in Table 6 and plots of these data are shown in FIGS. 3-5. Data was fit to the Fulcher equation and by using the parameters determined by fitting the data to the Fulcher equation, viscosities outside the experimental temperature range (e.g. at 450° C.) were estimated. No significant differences in the measured viscosities between the various compositions were observed and, therefore, other similar compositions are expected to exhibit similar viscosities.

TABLE 6

Viscosity data for several molten salt mixtures of mixed anion composition

| NO$_3$/ NO$_2$ ratio | Li (mol %) | Na (mol %) | K (mol %) | Viscosity at 133° C. (cP) | Viscosity at 197° C. (cP) | Viscosity at 450° C. (cP) |
|---|---|---|---|---|---|---|
| 1 | 20 | 40 | 40 | 25.0 | 10.2 | 5.8 |
| 1 | 15 | 42.5 | 42.5 | 24.5 | 8.5 | 4.7 |
| 1 | 29.1 | 22.6 | 48.3 | 25.0 | 10.0 | 6.0 |

Figure 6:
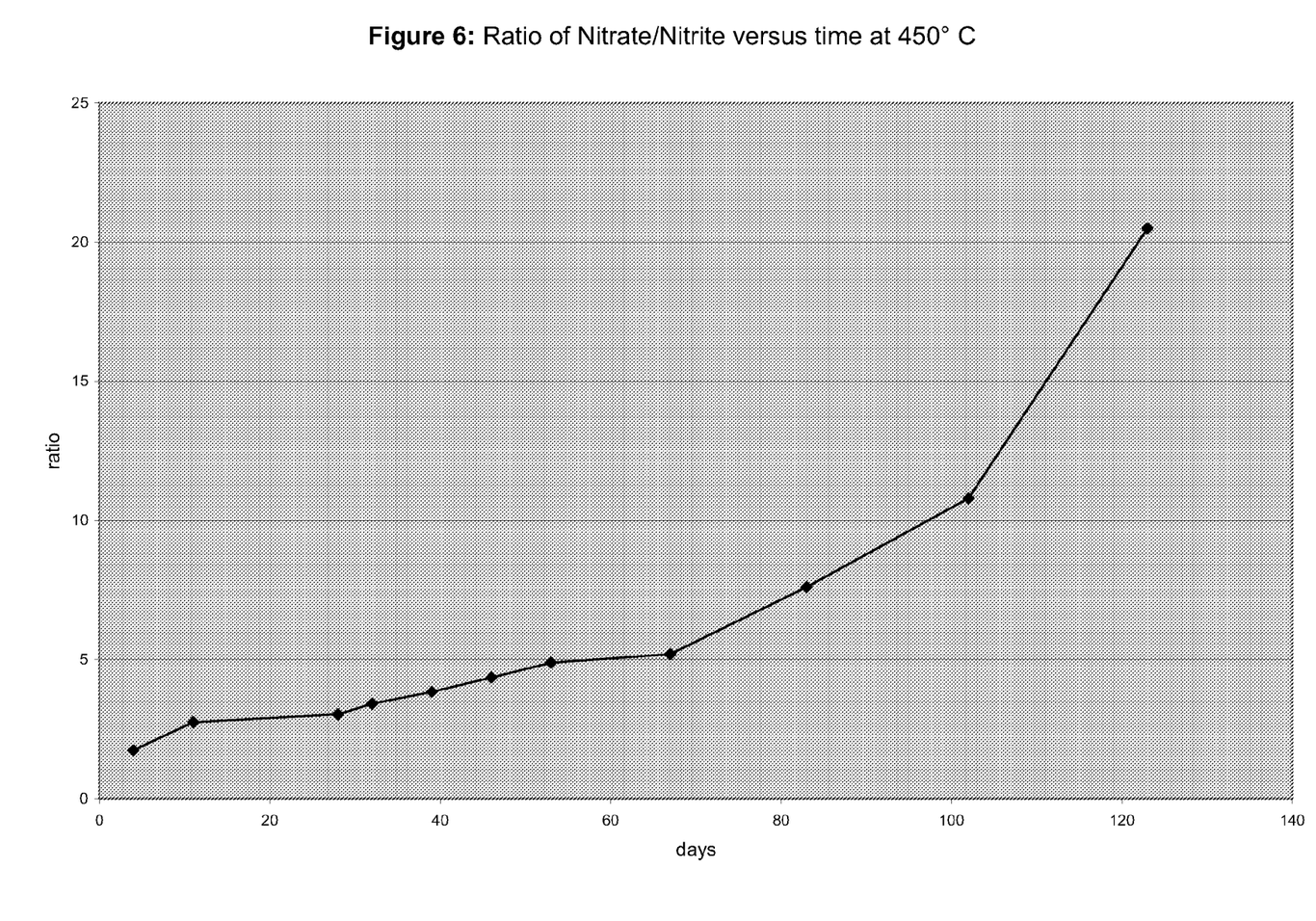
FIG. 6 shows the increase in nitrate/nitrite ratio of a salt mixture heated to 450° C. and exposed to ambient air.

Finally, as already noted earlier nitrite ions, as well as nitrate ions, may decompose at sufficiently high temperature to yield several types of oxide ion species. In order to at least qualitatively establish the thermal stability of these materials, a mixed anion system having 20 mol % Li, 27 mol % Na, and 53 mol % K and an initial nitrate/nitrite ratio of 1, was heated and maintained in air at a temperature of 450° C. for a period of about five months and periodically sampled to evaluate the change in nitrite content. FIG. 6 shows the result of this evaluation and demonstrates that the nitrate/nitrite salt mixtures must be protected against exposure to oxygen as the ratio of nitrate/nitrite increases significantly even for short periods of exposure to air.

The particular examples discussed above are cited to illustrate particular embodiments of the invention. Other applications and embodiments of the apparatus and method of the present invention will become evident to those skilled in the art. It is to be understood that the invention is not limited in its application to the details of construction, materials used, and the arrangements of components set forth in the following description or illustrated in the drawings. The scope of the invention is defined by the claims appended hereto.

What is claimed is:

1. A heat transfer fluid having a liquidus temperature of 95° C. or below comprising a mixture of $LiNO_3$, $NaNO_3$, $KNO_3$, $NaNO_2$ and $KNO_2$ salts consisting essentially of about 17.2 wt % $LiNO_3$, 15.9 wt % $NaNO_3$, 18.9 wt % $KNO_3$, 21.5 wt % $NaNO_2$ and 26.5 wt % $KNO_2$.

2. A heat transfer fluid having a liquidus temperature of 85° C. or below comprising a mixture of $LiNO_3$, $NaNO_3$, $KNO_3$, $NaNO_2$ and $KNO_2$ salts consisting essentially of about 26.5 wt % $LiNO_3$, 4.2 wt % $NaNO_3$, 12.5 wt % $KNO_3$, 13.8 wt % $NaNO_2$ and 43 wt % $KNO_2$.

3. A heat transfer fluid having a liquidus temperature of 80° C. or below comprising a mixture of $LiNO_3$, $NaNO_3$, $KNO_3$, $NaNO_2$ and $KNO_2$ salts consisting essentially of about 25.5 wt % $LiNO_3$, 4.2 wt % $NaNO_3$, 10.6 wt % $KNO_3$, 16.4 wt % $NaNO_2$ and 43.3 wt % $KNO_2$.

4. A heat transfer fluid having a liquidus temperature of about 85° C. or below comprising a $LiNO_3$, $KNO_3$, $NaNO_2$ and $KNO_2$ salt mixture consisting essentially of about 25.4 wt % $LiNO_3$, 20.7 wt % $KNO_3$, 20.1 wt % $NaNO_2$ and 33.8 wt % $KNO_2$.

5. A heat transfer fluid having a liquidus temperature of 75° C. or below comprising a mixture of $LiNO_3$, $KNO_3$, $NaNO_2$ and $KNO_2$ salts consisting essentially of about 26.2 wt % $LiNO_3$, 10 wt % $KNO_3$, 17.5 wt % $NaNO_2$ and 46.3 wt % $KNO_2$.

6. A heat transfer fluid having a liquidus temperature of 70° C. or below comprising a mixture of $LiNO_3$, $KNO_3$, $NaNO_2$ and $KNO_2$ salts consisting essentially of about 30 wt % $LiNO_3$, 3.1 wt % $KNO_3$, 16.7 wt % $NaNO_2$ and 50.2 wt % $KNO_2$.

* * * * *